United States Patent [19]

Barkan et al.

[11] 3,812,404

[45] May 21, 1974

[54] INCREASING THE INITIAL FLOW RATE IN A RECTIFIER ASSEMBLY EMPLOYING ELECTROMAGNETICALLY-PUMPED LIQUID METAL FOR COOLING

[75] Inventors: Philip Barkan; Fred W. Kelley, Jr.; Theodore A. Shook, all of Media, Pa.

[73] Assignee: General Electric Company, Philadelphia, Pa.

[22] Filed: May 29, 1973

[21] Appl. No.: 364,811

[52] U.S. Cl. ................ 317/234 R, 165/80, 165/105, 317/234 A, 317/234 B, 321/8 C

[51] Int. Cl. ............................ H01l 3/00, H01l 5/00

[58] Field of Search ......... 317/234, 1, 1.5; 321/8 C; 174/15; 165/80, 105

[56] References Cited

UNITED STATES PATENTS

| | | | |
|---|---|---|---|
| 3,654,528 | 4/1972 | Barkan | 317/234 R |
| 3,668,506 | 6/1972 | Beasley et al. | 317/234 B |

FOREIGN PATENTS OR APPLICATIONS

| | | | |
|---|---|---|---|
| 338,903 | 6/1959 | Germany | 317/234 B |

*Primary Examiner*—Andrew J. James
*Attorney, Agent, or Firm*—J. Wesley Haubner; William Freedman

[57] ABSTRACT

In each phase conductor of a polyphase rectifier system, there is a periodically-conducting rectifier assembly of the type comprising a semiconductor body and a cooling system for the body. The cooling system comprises a fluid circuit containing liquid metal and electromagnetic pumping means for forcing liquid metal through the fluid circuit. The electromagnetic pumping means comprises coil means, at least a portion of which is electrically connected in series with said semiconductor body. Means is provided for electrically connecting the coil means of the rectifier assemblies in circuit in such a way that when the rectifier assembly in any one phase conductor is blocking current therethrough, at least a portion of the coil means of said blocking rectifier assembly is energized by current passing through another of said phase conductors.

18 Claims, 16 Drawing Figures

PATENTED MAY 21 1974 3,812,404

SHEET 1 OF 5

INCREASING THE INITIAL FLOW RATE IN A RECTIFIER ASSEMBLY EMPLOYING ELECTROMAGNETICALLY-PUMPED LIQUID METAL FOR COOLING

CROSS REFERENCE TO RELATED PATENT

This application is related to U.S. Pat. No. 3,654,528 Barkan, assigned to the assignee of the present invention, and that patent is incorporated by reference in the present application.

BACKGROUND

This invention relates to a rectifier system that comprises a plurality of rectifier assemblies of the type employing electromagnetically-pumped liquid metal for cooling purposes and, more particularly, relates to means for developing in each rectifier assembly higher flow rates of the liquid metal during the interval immediately after the rectifier assembly starts to conduct during each of its conducting periods.

A rectifier assembly of the general type referred to hereinabove is described and claimed in the aforesaid Barkan patent. This rectifier assembly comprises a disc-like body partially of semiconductor material and a cooling system for the disc-like body which comprises magnetic pumping means for forcing liquid metal to flow adjacent the body and extract heat therefrom. The pumping means comprises: (1) electrically in series with the disc-like body, a pair of spaced electrodes on opposite sides of a pumping channel containing a portion of said liquid metal and (2) an electromagnet for providing a magnetic field having its flux lines extending across the pumping channel in a direction transverse to the current path between said electrodes. The electromagnet comprises a coil electricaly connected in series with said electrodes and said disc-like body.

While this type of cooling system has provided distinctly improved cooling as compared to the more conventional types, even further improvements are desirable. One respect in which such further improvements can be obtained is by increasing the flow rate of the liquid metal immediately after the rectifier assembly starts to conduct during each conducting period. Our tests with the rectifier assembly shown in the Barkan patent have demonstrated that even though the pressure in the pumping channel builds up very rapidly, lagging only slightly behind the current build-up, there is a substantially greater lag in the volumetric flow rate relative to current.

An object of our invention is to increase the flow rate in such a liquid-metal cooling system during the initial portion of the conduction period.

Another object of our invention is to increase the rate of build-up of the flow rate at the start of the conduction period and to decrease the lag between flow rate and current.

Another object is to continue pumping action in the liquid metal cooling system of a periodically-conducting rectifier assembly of the above type during periods when the semiconductor body of the rectifier assembly is non-conducting.

In carrying out our invention in one form, we provide a rectifier system comprising a plurality of conductors connected in a power circuit and a rectifier assembly connected in each conductor that blocks current through its associated conductor during periods while current is flowing through another of said conductors. Each rectifier assembly comprises a body of semiconductor material and a cooling system therefor comprising a fluid circuit containing liquid metal and magnetic pumping means for the liquid metal. The magnetic pumping comprises an electromagnet comprising coil means, at least a portion of which is electrically connected in series with said semiconductor body. Means is provided for electrically connecting the coil means of the rectifier assemblies in circuit in such a way that when the rectifier assembly in any one conductor is blocking current therethrough, at least a portion of the coil means of said blocking rectifier assembly is energized by current passing through another of said conductors.

BRIEF DESCRIPTION OF DRAWINGS

For a better understanding of the invention, reference may be had to the following description taken in conjunction with the accompanying drawings, wherein.

DETAILED DESCRIPTION OF PREFERRED EMBODIMENTS

Figure 1:
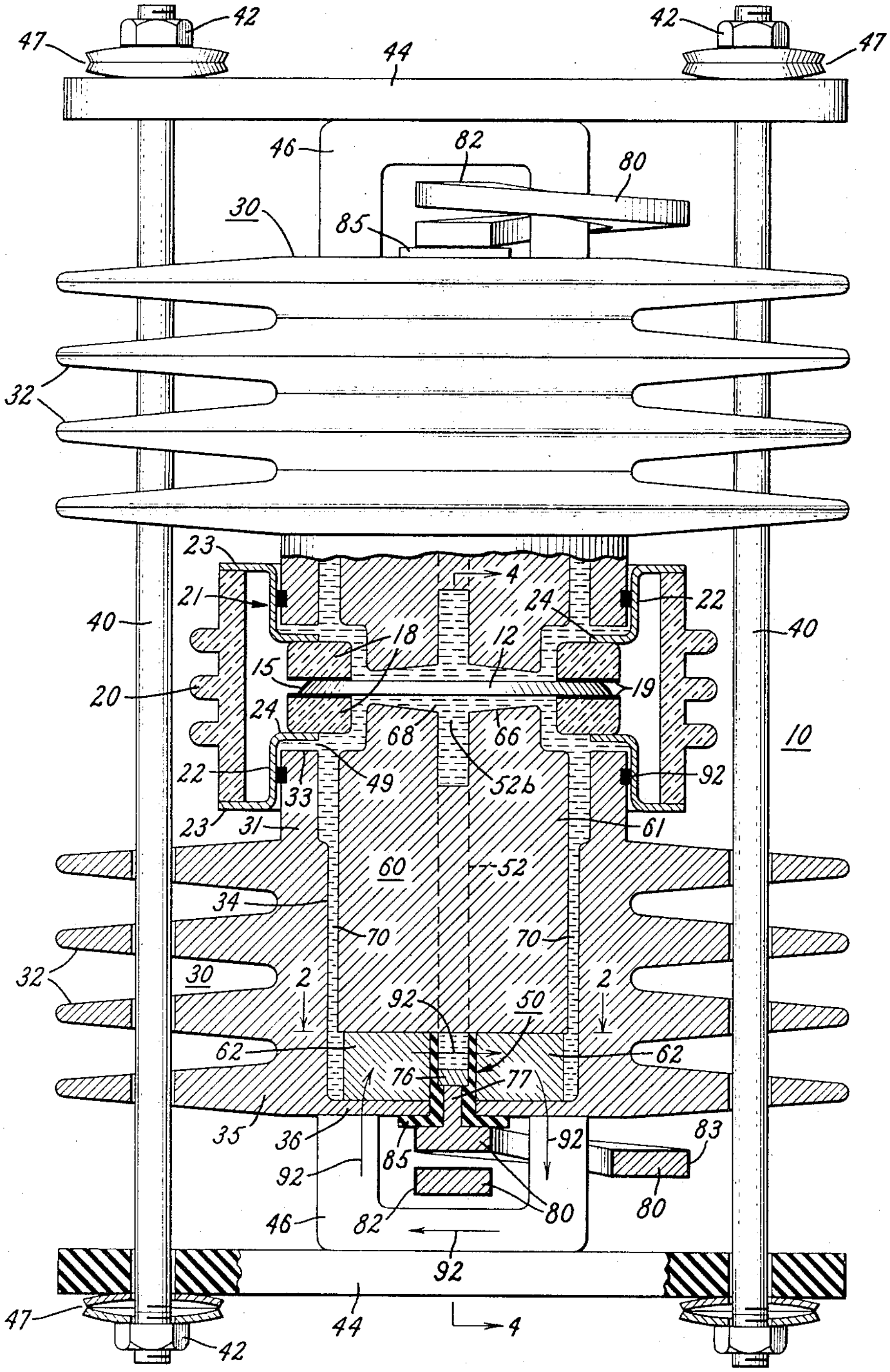
FIG. 1 is a sectional view of one form of rectifier assembly constituting a component of our invention.
Figure 2:
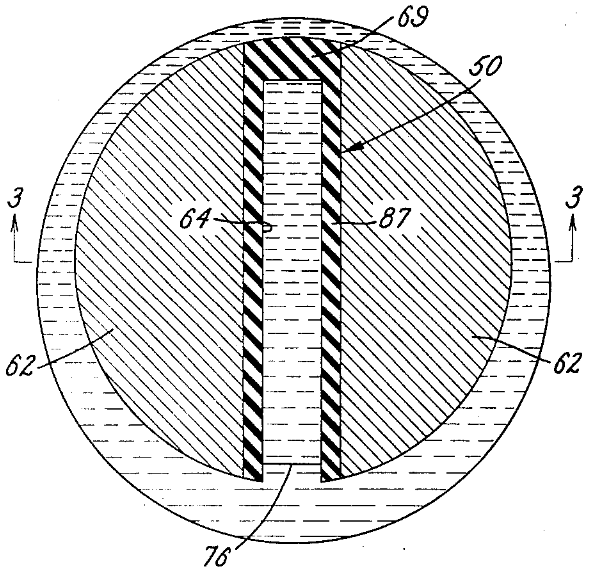
FIG. 2 is an enlarged sectional view along the line 2—2 of FIG. 1.

The rectifier assembly 10 shown in FIGS. 1–4 is in many respects similar to that shown and claimed in the aforesaid Barkan patent. Accordingly, the same reference numerals are used for the parts of FIGS. 1–4 as are used for corresponding parts in the Barkan patent; and reference may be had to said patent for a detailed description of such parts. Generally speaking, where the parts have been fully described in the Barkan patent, they will not be described in the present application except insofar as considered necessary or desirable to provide an understanding of the present invention. Emphasis in the present application will be placed on those features that are not shown in the Barkan patent.

In the rectifier assembly 10 of FIG. 1, part 12 is a disc-like body comprising a wafer of semiconductor material that contains at least one internal rectifying junction. The wafer has two opposed planar faces which may be bare but are preferably coated with thin protective coatings of metal of may be bonded to one or more thin substrates of metal. These coatings or substrates, where present, are considered to constitute portions of the disc-like body. For preventing the wafer from overheating in response to the current flowing therethrough during conduction periods of the wafer, there are provided, in the illustrated embodiment, two separate, substantially identical cooling systems, one at each side of the wafer 12. Each of these cooling systems comprises a heat sink 30 comprising a generally tubular outer member 35 of a high conductivity metal, such as copper, and a core 60, also primarily of copper. Each outer heat sink member 35 has a centrally located bore 34 extending longitudinally thereof and an outer end wall 36 extending across the bore at its outer end. Core 60 is located within the bore 34 and is suitably attached to the end wall 36.

The lower cooling system for wafer 12 comprises, at the lower side of the wafer, an electromagnetic pump 50, soon to be described in more detail, which operates to force liquid metal coolant upwardly through a flow pressure 52 in the core 60, then radially outward along the lower face of the wafer, and then downwardly through an annular passage 70 along the bore 34 of the tubular heat sink member 35. In the lower cooling system, the core 60 comprises a main body portion 61 of a highly conductive material such as copper and a pair of iron pole pieces 62 suitably attached to the lower end of main body portion 61. The pole pieces 62 are each of a generally semicircular cross-section as viewed in FIG. 2 and are spaced apart by a diametrically-extending pumping channel 64 extending across the bottom face of the core 60.

Figure 4:
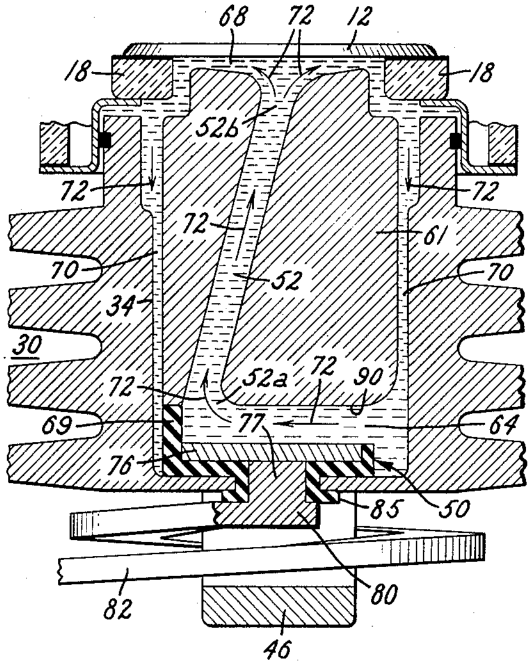
FIG. 4 is a sectional view along the line 4—4 of FIG. 1.
Figure 3:
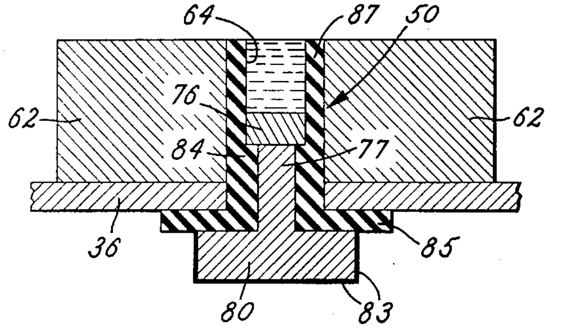
FIG. 3 is a sectional view along the line 3—3 of FIG. 2.

The lower core 60 has a slightly dished upper face 66 that is spaced a short distance from wafer 12 to leave a passageway 68 between the upper face 66 and the lower surface of wafer 12. As seen in FIG. 4, the passageway 68 above the core 60 and the pumping channel 64 beneath the core are interconnected by a feed passage 52, which extends from an inlet 52a at one end of channel 64 to an outlet 52b at a central location on the upper face 66 of the core. The outer periphery of core 60 is spaced radially inwardly from bore 34 to leave an annular passageway 70 between the core periphery and bore 34. Referring to FIG. 4, at the left-hand end of channel 64 there is a plug 69 of electrical insulating material that blocks the coolant flowing to the left through channel 64 from directly entering annular passage 70 through the left-hand end of the channel.

As illustrated in FIG. 4, the electromagnetic pump 50, when energized, forces the liquid metal coolant to circulate via the path indicated by the arrows 72. More specifically, the electromagnetic pump forces the coolant to flow to the left through the lower pumping channel 64, then upwardly through feed passage 52 through outlet **52*b*, radially outwardly through passageway 68, and then downwardly through annular passage 70 and back to the right hand end of channel 64**.

In passing radially outwardly along the lower face of wafer 12, the liquid metal coolant extracts heat from the wafer. In passing downwardly through annular passage 70, the heated coolant releases heat to the tubular heat sink member 35 through the surface of bore 34. After having thus released heat extracted from wafer 12, relatively cool coolant enters pumping channel 64 and is pumped through the channel and feed passage 52 to again become available to extract heat from wafer 12.

Although there are a number of different types of liquid metals that are suitable for use as coolants in the illustrated cooling system, we prefer to use a eutectic alloy of sodium and potassium, commonly referred to as NaK-77. This material is an excellent thermal conductor, an excellent electrical conductor, has a low density, and remains in the liquid state over a wide range of temperature, i.e, from −12° C to 1000° C.

THE ELECTROMAGNETIC PUMP 50

The usual electromagnetic pump comprises a conduit containing a conductive liquid, means for establishing a magnetic field having its flux lines extending transversely of the conduit through the conductive liquid, and means for conducting current through the liquid in a direction perpendicular to the flux lines. The current and the magnetic flux interact in a known manner to develop a pressure gradient in the conductive liquid which forces the liquid along the conduit in a direction perpendicular to the flux lines and the direction of the current.

The illustrated electromagnetic pump 50 operates in generally this manner and comprises current-directing means for forcing electrical current flowing through the rectifier assembly to follow a path that extends vertically through the conductive coolant in channel 64. This current-directing means comprises an electrode 76 that is positioned in the channel 64 and is of an elongated bar-form with its longitudinal dimension extending axially of the channel. Integral with electrode 76 is a conductive stud 77 that extends through the bottom wall 36 of the lower heat sink member 35. A coil 80 for generating the magnetic flux used in the pump is joined to the conductive stud 77 at its lowermost end. This coil 80, soon to be described in more detail, encircles one leg of the U-shaped iron core 46 and has an outer end 82 that serves as one terminal of the rectifier assembly. The illustrated coil 80 is formed of a rectangular cross-section conductor that is coated with electrical insulation 83.

Substantially all of the current that flows downwardly through the rectifier assembly into coil 80 can enter coil 80 only through electrode 76 and stud 77 since the coil 80 is otherwise electrically insulated from the remainder of the rectifier assembly. In this respect, note in FIGS. 1, 3, and 4 that the periphery of stud 77 is completely surrounded by electrical insulation 84 and that a portion 85 of the insulation is disposed between the upper surface of coil 80 and lower end wall 36. Such insulation allows current passing through the rectifier assembly to enter the stud 77 and coil 80 only through electrode 76. Additional electrical insulation allows current passing through the rectifier assembly to enter electrode 76, for the most part, only via a path that extends vertically across the channel 64 through the conductive liquid therein. This additional insulation comprises portions 87, which line the vertical walls of channel 64, and a portion of 84 which extends beneath the electrode 76. The top wall 90 of channel 64 is free of electrical insulation and thus nearly all of the current enters the conductive liquid only through the top wall 90. This top wall portion 90 may be considered as one of the electrodes of the pump 50. The current entering through top wall 90, for the most part, flows downwardly through the conductive liquid in channel 64, exiting through electrode 76. Preferably, electrode 76 has an insulating coating on its right hand end (FIG. 4) to prevent current from entering the electrode 76 through this end and bypassing the above-described vertical path through channel 64.

As mentioned hereinabove, the magnetic field for the electromagnetic pump 50 is developed by current flowing through coil 80. This current develops magnetic flux which follows a path, indicated by arrows 92 in FIG. 1, through a magnetic circuit comprising the U-shaped magnetic core 46, the iron pole pieces 62, and the gap between the pole pieces 62 formed by channel 64. This flux follows a path across channel 64 which extends substantially horizontally. Since, as previously described, the electric current through the conductive liquid in channel 64 follows a vertically-extending path, the flux and the current are able to interact to force the conductive liquid in channel 64 longitudinally thereof toward the left in FIG. 4. It is noted that no current flows through the magnetic core 46 inasmuch as this core is mounted on an insulating member 44 and is locally insulated from coil 80.

The flow rate developed by pump 50 varies directly with the magnitude of the current through the rectifier assembly. For low currents, this flow rate is relatively low; but when the current increases, the flow rate increases correspondingly. An advantage of an electromagnetic pump is that it is capable of responding rapidly to a rise in current. Within a few milliseconds, the electromagnetic pump can accelerate the liquid metal coolant to the required high flow rate, thus making available rapidly the increased cooling effect resulting from the higher flow rate.

RECTIFIER SYSTEM

Figure 5:
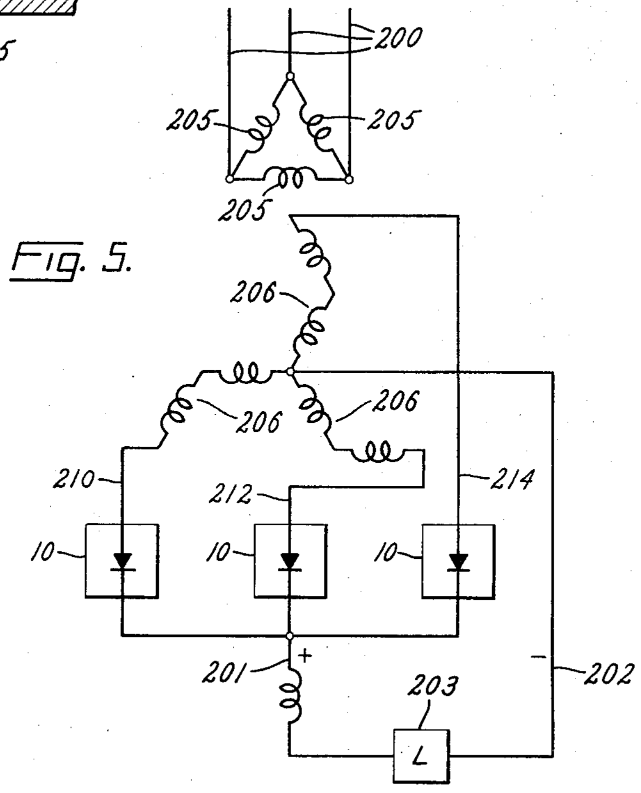
FIG. 5 is a schematic circuit diagram of a rectifier system in which our invention can be utilized.

Consider now a conventional 3-phase single-way rectifier system such as schematically depicted in FIG. 5. This system comprises 3-phase a-c input leads 200 and a pair of d-c output leads in the form of a positive bus 201 and a negative bus 202 across which a suitable load 203 is connected. A conventional smoothing reactor 204 is connected in series with bus 201. The system further comprises a power transformer having three delta-connected primary windings 205 and three zig-zag wye connected secondary windings 206. The negative d-c bus 202 is connected to the neutral of the secondary windings. The free terminals of the secondary windings 206 are respectively connected to three phase conductors 210, 212, and 214. Connected in series with each of these phase conductors is a rectifier assembly 10, which initially will be assumed to be constructed as described in the aforesaid Barkan patent and as further described hereinabove. The cathodes of these rectifier assemblies are connected to the positive bus 201.

Figure 6:
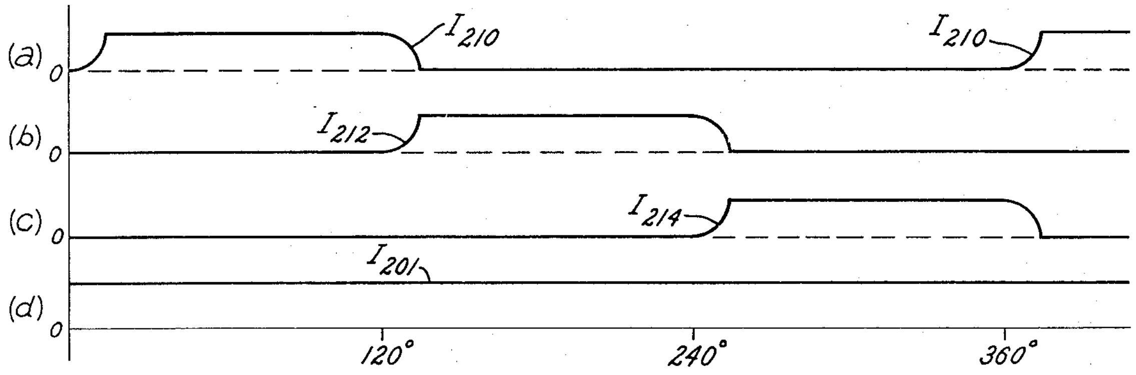
FIG. 6 is a graphical representation of certain time-current relationships present in the circuit of FIG. 5.

The current through the three phase conductors 210, 212, and 214 is represented in curves (*a*), (*b*), and (*c*), respectively, of FIG. 6. The current in positive bus 201 is indicated by the curve (*d*) of FIG. 6. It will be noted that each rectifier assembly is periodically-conducting, conducting for approximately 130° of each cycle and being non-conducting, or blocking, for approximately 230°. As will be apparent from FIG. 6, the rectifier assemblies commence conducting in sequence; and while one of the rectifier assemblies is blocking, current is flowing through one or more of the other rectifier assemblies.

If a rectifier assembly 10 of a construction such as described up to this point is connected in each phase, it will be apparent that no effective pumping action is occurring in its electromagnetic pump 50 during the 230° period when the rectifier assembly is blocking. This pumping action is generally proportional to I × B, where I is the current flowing through the pumping channel vertically and B is the flux density of the magnetic field perpendicular to this current path. Some residual flux remains after a conduction period as a result of eddy currents producing a lag in the flux behind the current, but since I is substantially zero during the blocking period, I × B will also be substantially zero.

Figure 7:
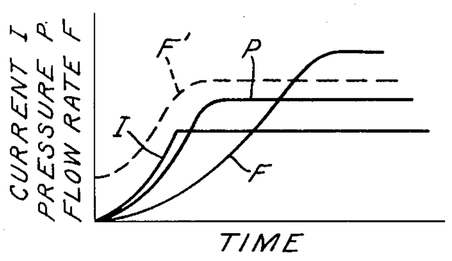
FIG. 7 is a graphical representation illustrating the current, pressure, and flow rate at the start of a conduction period in the circuit of FIG. 5.

During the blocking period in each rectifier assembly, there is some flow of liquid metal coolant due to inertia effects, but the flow rate decays severely during this interval since no effective pumping action is then occurring. Accordingly, when the current builds up again at the start of the next conduction period, the flow rate must be built up from a very low level. This factor, combined with the delay in build-up of the magnetic field as a result of eddy currents, results in a flow rate that is sometimes not as high as desired during the initial portion of the conduction period. This relationship is depicted in FIG. 7, where it can be seen that the current I builds up very rapidly; the pressure P builds up slightly less rapidly with a slight lag; and the flow F builds up considerably less rapidly with a substantially greater lag.

Figure 9:
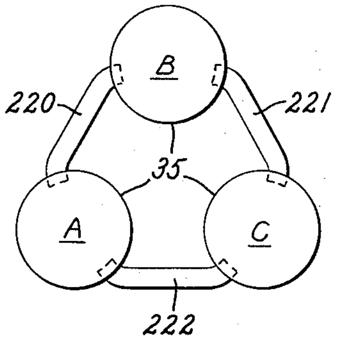
FIG. 9 is a more detailed showing of structure embodying the form of the invention illustrated in FIG. 8.
Figure 8:
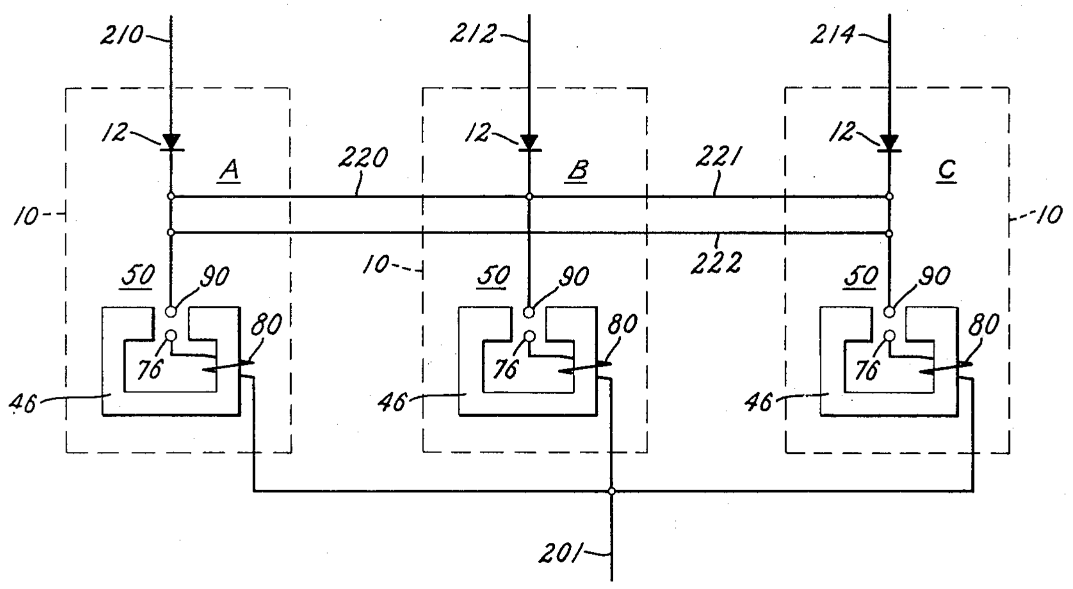
FIG. 8 is a schematic showing of one form of our invention.

One way that we act to increase the flow present during the initial portion of the conduction period is schematically illustrated in FIG. 8. In this figure, rectifier assemblies A, B, and C, each corresponding to that shown at 10 in FIGS. 1–4, are connected in the respective phases 210, 212, and 214. In FIG. 8, the electromagnetic pump 50 of each rectifier assembly is schematically depicted as comprising spaced electrodes 90 and 76, a magnetic core 46, and a coil 80 linked to the core, as in FIGS. 1–4. The feature of special interest in FIG. 8 is the connections 220, 221, and 222 that are joined to each rectifier assembly at a location electrically between the cathode of semiconductor body 12 and the immediately-adjacent, or positive, electrode 90 of the associated pump 50. As shown in the more detailed illustration of FIG. 9, the terminals of these connections 220, 221, and 222 are located on the outer heat sink members 35 of the rectifier assemblies A, B, and C.

When the rectifier assembly A in phase conductor 210 is conducting, current flows through the electrical circuit of its own electromagnetic pump 50, producing the hereinabove described pumping action and resultant cooling of its wafer 12. Although the rectifier assemblies B and C in the other phases are blocking, or non-conducting during most of rectifier A's conduction period, we are able to continue pumping action in these rectifier assemblies B and C during their blocking periods. This is done by diverting a portion of the total current that flows through the wafer 12 in the rectifier assembly A of phase 210 through the pumps of the then-blocking rectifier assemblies B and C via the connections 220, 221, and 222. The current thus diverted into each of the pumps flows between the pump electrodes 90, 76 and through the coil 80 of the pump, thus continuing the pumping action in B and C.

Correspondingly, when rectifier B is conducting and A and C are non-conducting, a portion of the current through B is diverted through the pumps of A and C to continue pumping action in A and C. Similarly, when C is conducting and A and B are not, a portion of the current through C is diverted through the pumps of A and B to continue pumping action in A and B.

The portion of the current diverted in the above manner can be controlled with greater precision by providing suitable impedances (not shown) of low value in the connections 220, 221, and 222.

It is significant that the connections 220, 221, and 222 are located on the cathode sides of the rectifier assemblies A, B, and C. In this location, these connections do not constitute short circuits between the phases because there is always a blocking rectifier in any path between the phase conductors via one of these connections. If these connections were located in whole or part at the anode sides, instead of the cathode sides, of the rectifier assemblies tbey could constitute short-circuits between the phase conductors.

The above-described pumping action that occurs in each rectifier assembly during its blocking period is beneficial not only in cooling the blocking rectifier assembly during this period but also in increasing the flow rate at the start of the next conduction period. Instead of the flow rate building up as depicted in curve F of FIG. 7, it builds up generally in accordance with a curve F'. This curve F' starts at a higher flow rate than the curve F, and, as a result, a substantially higher flow rate is available for cooling during the early portion of the conduction period as compared to when the flow rate follows curve F.

Figure 10:
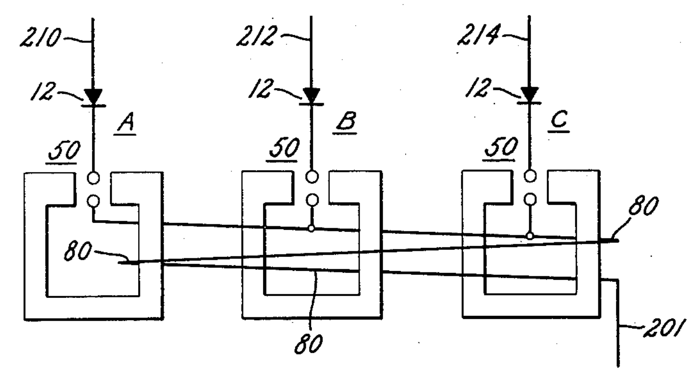
FIG. 10 is a schematic showing of another form of our invention.

FIG. 10 schematically illustrates another embodiment of our invention in which current through a phase that has been conducting is utilized to increase the flow rate in the pump of another phase at the start of the conduction period for this other phase. In the embodiment of FIG. 10, each of the rectifier assemblies is the same as that depicted in FIGS. 1–4 except for the coil means 80 that is linked to its magnetic core 46. In the embodiment of FIG. 10, the coil means 80 of the three pumps are, in effect, electrically connected in series, forming a single composite coil linked to the cores 46 of the three pumps. The current paths between the pump electrodes 90, 76 of the respective rectifier assemblies are connected to said composite coil at spaced locations along the length of the composite coil.

In the embodiment of FIG. 10, when rectifier assembly A is conducting and B and C are blocking, the current through A operates its own pump and also passes through the coils of the pumps of B and C, causing flux to be developed in the pumps of B and C. No pumping action occurs in the pumps of B and C while B and C are non-conducting since no current is then flowing between the pump electrodes in B and C. But when B later becomes conducting, the flow rate in its pump can be built up at a substantially increased rate because flux is already present to interact with the current that starts flowing therethrough. While B is conducting, the current therethrough energizes not only its own coil means 80 but also the coil means 80 of C and a portion of the coil means 80 of A. Thus, when C starts to conduct near the end of B's conduction period, flux is present in C's pump to immediately interact with current in C and rapidly initiate pumping action without waiting for flux to build up in the core of C's pump. Later, at the start of A's conduction period, flux is present within A's pump as a result of current from C energizing a portion of coil means 80 of A during C's conduction period.

Thus, when any one of the rectifier assemblies begins its conduction period, a substantial level of flux is already present within its pump to immediately initiate pumping action and to contribute to a substantially higher flow rate during the initial portion of the conduction period.

Figure 11:
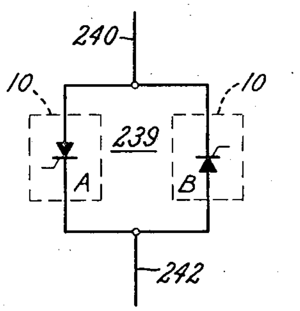
FIG. 11 is a schematic circuit diagram of another rectifier system in which our invention can be utilized.

Our invention also has application to the type of static switch where rectifier assemblies are connected in inverse parallel relationship. Such a switch is schematically illustrated at 239 in FIG. 11 where the rectifier assemblies 10 are shown as thyristors connected in inverse parallel relationship in an a-c circuit 240, 242 between a source and a load (neither of which is shown). When the switch 239 is in its ON mode, thyristor A is triggered into conduction during each positive half-cycle of current to provide a path for current to flow from conductor 240 to 242; and thyristor B is triggered into conduction during each negative half-cycle to provide a path for current to flow from 242 to 240. Thyristor B blocks while thyristor A is conducting, and A blocks while B is conducting. The switch 239 can be turned off by withholding triggering pulses from the rectifier assemblies. For a more specific showing of how such a switch can be applied, reference may be had to U.S. Pat. Nos. 3,558,983-Steen or 3,611,043-Steen, assigned to the assignee of the present invention.

Figures 12, 13, 14:
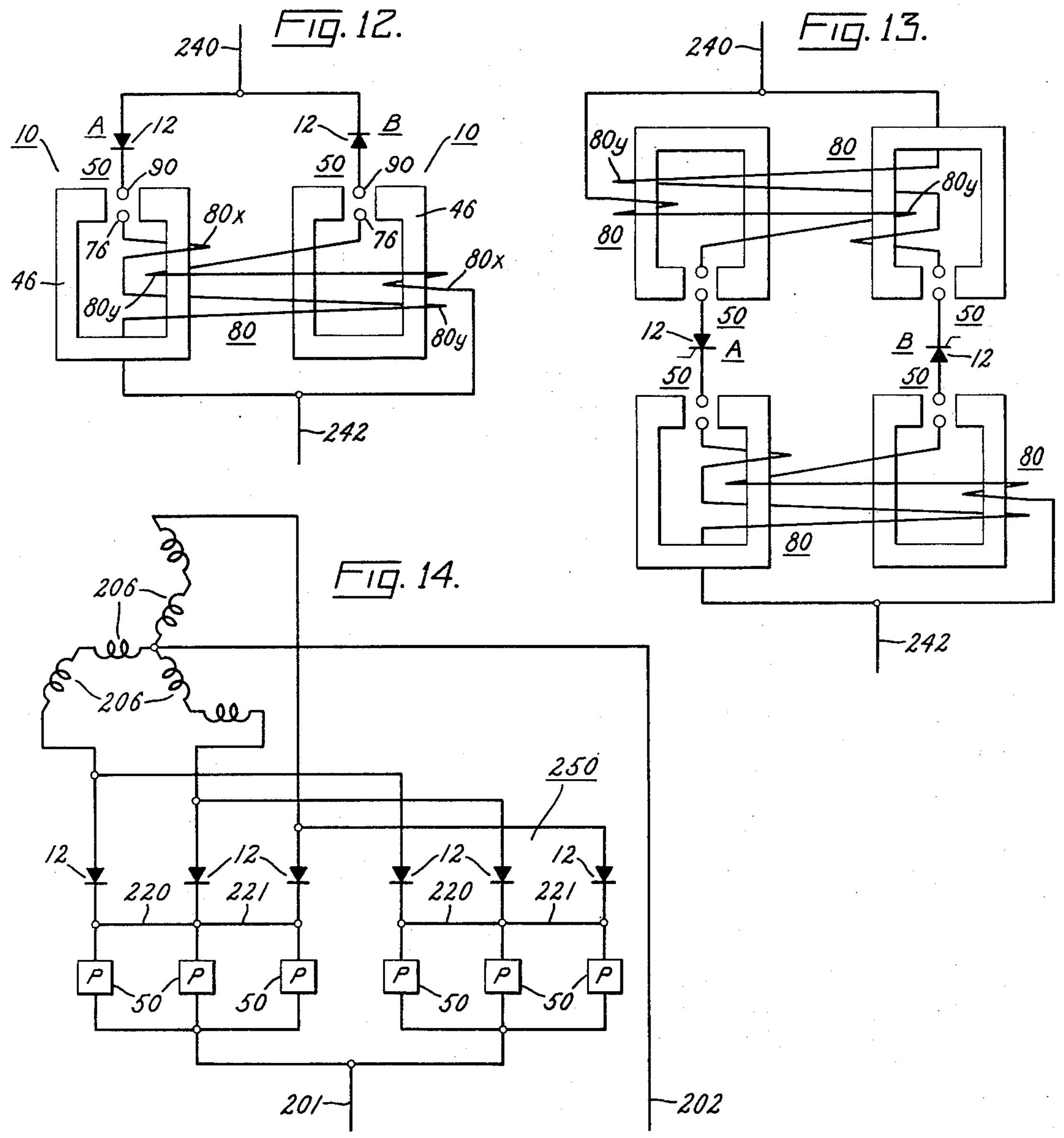
FIG. 12 illustrates in more detail an application of our invention to the circuit of FIG. 11.
FIG. 13 illustrates another application of our invention to the circuit of FIG. 11.
FIG. 14 shows still another application of our invention.

The rectifier assemblies 10 are shown in more detail in FIG. 12. Each of these assemblies generally corresponnds to the recifier assembly shown in FIGS. 1–4 of the aforesaid Barkan patent except for the coil means 80. In our FIG. 11 the coil means 80 of each pump 50, instead of being a single coil, comprises two separate coil sections, 80*x* and 80*y*. In each rectifier assembly, the main coil section 80*x* is connected in series with the wafer 12 and the pump electrodes 90, 76 of the associated rectifier assembly, but the other coil section 80*y* is connected in series with the wafer 12 and pump electrodes of the other rectifier assembly. Thus, when current flows downwardly through rectifier assembly A, it not only operates its own pump as it traverses main coil section 80*x* but also develops flux in the pump of rectifier assembly B as it traverses coil section 80*y* of rectifier assembly B. Accordingly, when B first turns on after A has been conducting, there is flux immediately available in the pump of B to immediately begin effective pumping action in B. Correspondingly, when current flows upwardly through rectifier assembly B, it not only operates the pump 50 of rectifier assembly B but also develops flux in the pump of the other rectifier assembly A. Thus, when A turns on after B has been conducting, there is flux immediately available in the pump of A to immediately begin effective pumping action in A.

Preferably the rectifier assemblies used in the embodiment of FIG. 12 are each of the type having pumps at both sides of its wafer, i.e., an anode pump and a cathode pump. Only the cathode pump of A and the anode pump of B are shown in FIG. 12. The rectifier assemblies are inverted with respect to each other so that the coil section 80*y* in the coil means 80 at the anode side of rectifier assembly B is electrically located at the cathode side of the rectifier assembly A. Correspondingly, the coil section 80*y* in the coil means 80 of rectifier assembly B at its cathode side is electrically located at the anode side of the other rectifier assembly A.

In the embodiment of FIG. 13, pumps 50 at both sides of each rectifier assembly are shown. Here, the coil means 80 in the anode pump of rectifier assembly A comprises a coil section 80*y* in series with the other rectifier assembly B and located at the cathode side of the other rectifier assembly B. Correspondingly, the coil means 80 in the cathode pump of rectifier assembly B comprises a coil section 80*y* in series with the other rectifier assembly A and located at the anode side of the other rectifier assembly A. The coil means 80 at the lower sides of the two rectifier assemblies in FIG. 13 correspond to those shown in FIG. 12.

In the embodiment of FIG. 13, when rectifier assembly A is conducting, flux is developed in the pumps at both sides of rectifier assembly B. Accordingly, when A turns on after B's conduction period, effective pumping action can begin immediately in the pumps at both sides of B. Correspondingly, when B turns on after A's conduction period, flux is immediately available in both of B's pumps to enable these pumps in B to immediately begin effective pumping action.

It is to be understood that the invention in its broader aspects also has application to rectifier systems other than those specifically illustrated in the drawings. As an example, the invention can be applied to a six-phase rectifier system either by interconnecting the pumps in all six phases in the general manner shown in FIG. 8 or in the general manner shown in FIG. 10 or by treating each group of three phases in the manner shown in either FIG. 8 or in FIG. 10. As another example, in very high current applications, one or more rectifier assemblies can be connected in parallel with each of the rectifier assemblies 10 of FIG. 5, and the rectifier assemblies in the three phases of each of these added parallel groups can be interconnected in the manner shown in FIG. 8 or in FIG. 10. FIG. 14 depicts one such parallel group at 250. Connections corresponding to 220, 221, 222 are provided between the rectifier assemblies of this added group in the same locations as in FIG. 8. In FIG. 14, the electromagnetic pumps 50 are designated P.

Figure 15:
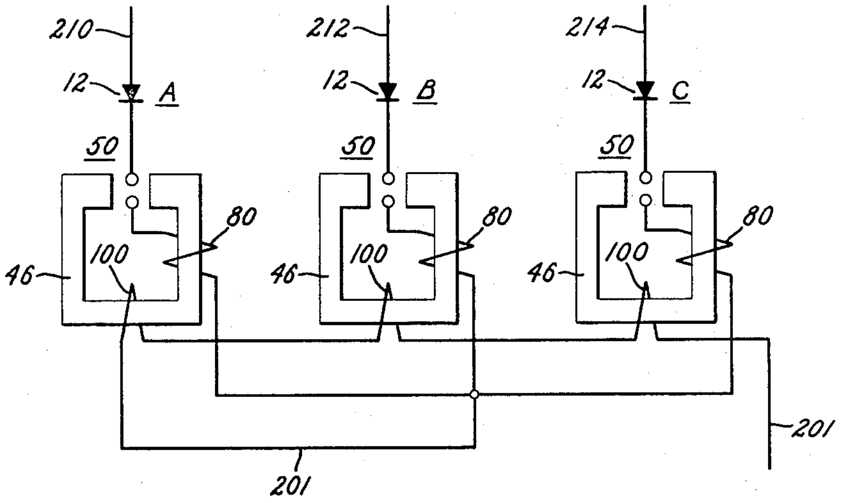
FIG. 15 shows another embodiment of the invention.

Another way of developing a substantial level of flux for availability at the start of each conduction period is illustrated in FIG. 15. In this arrangement the magnetic core 46 of each pump is provided with an auxiliary winding 100. The auxiliary windings 100 are connected in series with each other and with the d.c. bus 201. Accordingly, the d.c. that flows through bus 201 also passes through these auxiliary windings 100. This d.c. through windings 100 develops flux in the same direction as the flux developed by current through each of the main windings 80. Thus, flux for pumping in the proper direction is available at the start of the conducting period of each rectifier.

Figure 16:
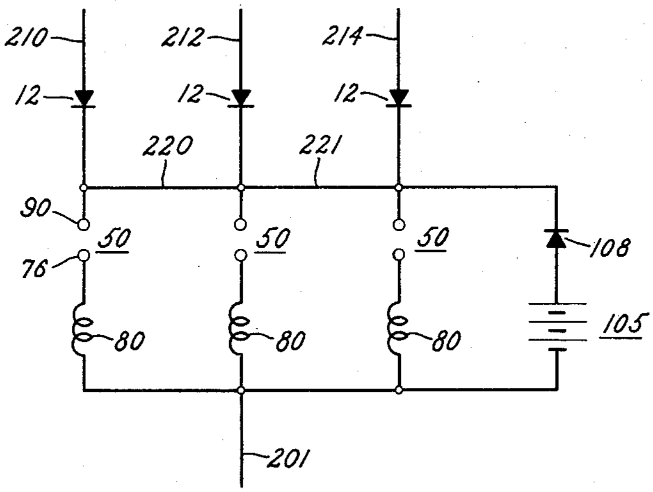
FIG. 16 shows still another embodiment of the invention.

Still another way of developing a substantial level of flux for availability at the start of each conduction period is illustrated in FIG. 16. Here, a separate source 105, shown as a d.c. source, is connected across the parallel combination of the electrical circuits of the three pumps 50. This source 105 supplies auxiliary current continuously to each of the pump circuits, forcing this auxiliary current to flow in the same direction as normal power current, thus making flux available for pumping at the start of the conduction period of each rectifier. In addition, the current flowing through each pump circuit during the non-conducting period of the associated rectifier produces a pumping action during this non-conducting period that desirably cools the rectifier and limits its temperature. A blocking diode 108 is shown connected in series with source 105, and this diode serves to prevent the conductive path through the source from acting at any time as a low impedance path for power circuit current. It is to be noted that all conductors connected between the phase conductors 210, 212, and 214 are on the d.c. side of the main rectifiers 12, thus preventing these conductors from acting as short circuits between the phase conductors. The other arrangements have an advantage over that of FIG. 16 in not requiring a separate source for providing the desired flux.

While we have shown and described particular embodiments of our invention, it will be obvious to those skilled in the art that various changes and modifications may be made without departing from our invention in its broader aspects; and we, therefore, intend in the appended claims to cover all such changes and modifications as fall within the true spirit and scope of our invention.

We claim:

1. In a rectifier system comprising a plurality of conductors connected in a power circuit, a. a rectifier assembly connected in each conductor for blocking current through its associated conductor during periods while current is flowing through another of said conductors, b. each rectifier assembly comprising a body at least partially of semiconductor material and a cooling system for cooling said body, c. said cooling system comprising: (i) a fluid circuit having a portion located adjacent said body and containing liquid metal and (ii) electromagnetic pumping means for forcing said liquid metal to flow through said fluid circuit and extract heat from said body, d. said pumping means of each rectifier assembly comprising, electrically in series with said body, a pair of spaced electrodes on opposite sides of liquid metal in said fluid circuit between which current flows across said liquid metal when said pumping means is in operation and an electromagnet for providing a magnetic field having flux lines extending across the portion of said fluid circuit traversed by electric current passing between said spaced electrodes in a direction transverse to said current, e. said electromagnet of each rectifier assembly comprising coil means, at least a portion of which is electrically connected in series with said electrodes and said body, f. and means for electrically connecting the coil means of said rectifier assemblies in circuit in such a way that when the rectifier assembly in any one conductor is blocking current therethrough, at least a portion of the coil means of said blocking rectifier assembly is energized by current passing through another of said conductors.

2. The combination of claim 1 in which said conductors are the phase conductors of a polyphase a-c system.

3. The combination of claim 1 in which said rectifier assemblies are connected in inverse parallel relationship.

4. The combination of claim 1 in which:

a. said conductors are the phase conductors of a polyphase a-c system, b. each of said semiconductor bodies comprises at least one internal rectifying junction and an anode and a cathode at opposite sides of said junction, c. the pump electrodes in each rectifier assembly are located between the cathode of the semiconductor body and the coil means of the rectifier assembly, and d. said connecting means of (f) of claim 1 comprises an electrical connection between the cathodes of said semiconductor bodies joined to each rectifier assembly at a location electrically between said cathode and the electrode of the associated pumping means immediately adjacent said cathode.

5. The combination of claim 1 in which:

a. said conductors are the phase conductors of a polyphase a-c system, b. the coil means of each rectifier assembly is electrically connected in series with the pump electrodes and the semiconductor body of said rectifier assembly, and c. said connecting means of (f) of claim 1 comprises means for directing a portion of the current passing through the semiconductor body of each conducting rectifier assembly through the coil means of the other rectifier assemblies when said other rectifier assemblies are in a blocking state.

6. The combination of claim 5 in which: said connecting means is so located that it directs a portion of the current passing through the semiconductor body of each rectifier assembly to flow through paths extending between the pump electrodes of the other rectifier assemblies, whereby pumping is effected in said other rectifier assemblies even when said other rectifier assemblies are blocking.

7. The combination of claim 1 in which:

a. said conductors are the phase conductors of a polyphase a-c system, b. the electromagnet of each rectifier assembly comprises a core of magnetizable material for locating said magnetic field of each pumping means, c. the coil means of the rectifier assemblies are electrically interconnected in series to form a composite coil linked to the cores of the pumping means of said rectifier assemblies, and d. the current paths between the pump electrodes of the respective rectifier assemblies are connected to said composite coil at space points along the length of said composite coil.

8. The combination of claim 1 in which:

a. there are two of said rectifier assemblies electrically connected in inverse parallel relationship, b. the coil means of each rectifier assembly comprises two coil sections, one of said coil sections being electrically connected in series with the semiconductor body and pump electrodes of the associated rectifier assembly and the other of said coil sections being electrically connected in series with the pump electrodes and semiconductor body of the other rectifier assembly.

9. The combination of claim 8 in which the coil means of one rectifier assembly is electrically located at the cathode side of the semiconductor body in said one rectifier assembly and the coil means of the other rectifier assembly is electrically located at the anode side of the semiconductor body of the other rectifier assembly.

10. The combination of claim 1 in which:

a. there are two of said rectifier assemblies electrically connected in inverse parallel relationship, b. each rectifier assembly comprises two pumping means respectively located at the anode and cathode sides of its semiconductor body, c. each pumping means is constructed as specified in (d) of claim 1, d. the coil means of each pumping means comprises two coil sections, one of said coil sections being electrically connected in series with the semiconductor body and pumping electrodes of the associated rectifier assembly and the other of said coil section being electrically connected in series with the pump electrodes and semiconductor body of the other rectifier assembly.

11. The combination of claim 10 in which:

a. the coil section of the pumping means at the anode side of each rectifier assembly which is electrically connected in series with the semiconductor body of the other rectifier assembly is electrically located at the cathode side of said other rectifier assembly, and b. the coil section of the pumping means at the cathode side of each rectifier assembly which is electrically connected in series with the semiconductor body of the other rectifier assembly is electrically located at the anode side of said other rectifier assembly.

12. The combination of claim 1 in which:

a. said conductors are the phase conductors of a polyphase a-c system, b. each rectifier assembly has a cathode terminal connected to a d.c. bus, and c. the coil means of said rectifier assemblies include portions connected in series with each other and with said d.c. bus for energization by the d.c. current through said d.c. bus.

13. In a polyphase rectifier system comprising a plurality of phase conductors connected in a power circuit, a. a rectifier assembly connected in each phase conductor for conducting current in said phase conductor during predetermined periods and for blocking current through its associated phase conductor during periods while current is flowing through another of said phase conductors, b. each rectifier assembly comprising a body at least partially of semiconductor material and a cooling system for cooling said body, c. said cooling system comprising: (i) a fluid circuit having a portion located adjacent said body and containing liquid metal and (ii) electromagnetic pumping means for forcing said liquid metal to flow through said fluid circuit and extract heat from said body, d. said pumping means of each rectifier assembly comprising, electrically in series with said body, a pair of spaced electrodes on opposite sides of liquid metal in said fluid circuit between which current flows across said liquid metal when said pumping means is in operation and an electromagnet for providing a magnetic field having flux lines extending across the portion of said fluid circuit traversed by electric current passing between said spaced electrodes, e. said electromagnet of each rectifier assembly comprising coil means, at least a portion of which is electrically connected in series with said electrodes and said body, f. and means for causing current to flow through at least a portion of the coil means of each rectifier assembly while said rectifier assembly is blocking current through its associated phase conductor.

14. The combination of claim 13 in which said means of f. comprises a separate source of power and means for connecting the pumping means of said rectifier assemblies in parallel with each other across said separate source.

15. A periodically-conducting rectifier assembly comprising:

a. a semiconductor body and a cooling system for said body, b. said cooling system comprising: (i) a fluid circuit having a portion located adjacent said body and containing liquid metal and (ii) electromagnetic pumping means for forcing said liquid metal to flow through said fluid circuit and extract heat from said body, c. said pumping means comprising a pair of spaced electrodes disposed electrically in series with said body and mechanically in contact with said liquid metal on opposite sides of said fluid circuit, and an electromagnet operable when energized to provide a magnetic field having flux lines extending across the portion of said fluid circuit traversed by electric current passing between said electrodes in a direction transverse to said current, said electromagnet being energized by current flowing through said semiconductor body and between said electrodes, d. and means for supplying an auxiliary current for energizing said electromagnet prior to a period of current flow through said semiconductor body.

16. In an electric power system comprising a plurality of periodically-conducting rectifier assemblies which are interconnected and arranged to commence conducting in sequence, each rectifier assembly being constructed as specified in claim 15, said auxiliary current which is supplied to the electromagnet of a rectifier assembly during a non-conducting period thereof being derived from the current conducted by another of said rectifiers during a conducting period thereof.

17. The improvement of claim 16 in which said power system comprises an alternating current source and an a-c load circuit, said rectifier assemblies being connected in inverse parallel relationship with one another to conduct load current between said source and said load circuit.

18. The improvement of claim 16 in which said power system comprises a polyphase alternating current source and a d-c load circuit, said rectifier assemblies being respectively connected between the different phases of said source and said load circuit.

* * * * *